United States Patent
Goto et al.

(10) Patent No.: US 9,493,072 B2
(45) Date of Patent: Nov. 15, 2016

(54) SAFETY CONFIRMATION SUPPORT SYSTEM FOR VEHICLE DRIVER AND METHOD FOR SUPPORTING SAFETY CONFIRMATION OF VEHICLE DRIVER

(71) Applicant: DENSO CORPORATION, Kariya, Aichi-pref. (JP)

(72) Inventors: Hirotaka Goto, Nagoya (JP); Katsuyoshi Nishii, Okazaki (JP); Toshiaki Nakayama, Miyoshi (JP); Shohei Morikawa, Ichinomiya (JP); Yasutsugu Nagatomi, Nisshin (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/734,058

(22) Filed: Jun. 9, 2015

(65) Prior Publication Data

US 2015/0360565 A1 Dec. 17, 2015

(30) Foreign Application Priority Data

Jun. 11, 2014 (JP) .................................. 2014-120101

(51) Int. Cl.
*B60K 35/00* (2006.01)
*G02B 27/01* (2006.01)
(Continued)

(52) U.S. Cl.
CPC .................. *B60K 35/00* (2013.01); *B60R 1/00* (2013.01); *G02B 27/01* (2013.01); *G09G 3/2003* (2013.01); *G09G 3/2059* (2013.01);
(Continued)

(58) Field of Classification Search
CPC .............. B60R 1/00; B60R 2300/105; B60R 2300/205; B60R 2300/307; B60R 2300/308; B60R 2300/802; B60R 2300/8026; B60R 2300/8093; B60K 35/00; B60K 2350/1068; B60K 2350/2013; G02B 2027/0138; G02B 2027/014; G02B 2027/0187
See application file for complete search history.

(56) References Cited

U.S. PATENT DOCUMENTS

| 6,424,272 B1 * | 7/2002 | Gutta | B60R 1/00 340/435 |
| 6,476,855 B1 * | 11/2002 | Yamamoto | B60R 1/00 348/148 |

(Continued)

FOREIGN PATENT DOCUMENTS

| EP | 1491978 A1 * | 12/2004 |
| JP | 06230132 A * | 8/1994 |

(Continued)

OTHER PUBLICATIONS

JPO machine translation of JP 2006-224700 (original JP document published Aug. 31, 2006).*

*Primary Examiner* — Behrang Badii
*Assistant Examiner* — David Testardi
(74) *Attorney, Agent, or Firm* — Posz Law Group, PLC (57) ABSTRACT

In a driver's safety confirmation support system, a moving object detection section detects a moving object approaching to a vehicle in any of detection areas around a vehicle. When the moving object detection section detects the moving object in the detection area on a left side of the vehicle, a display control section controls a right display section provided in a right area relative to a driver's seat to display information regarding the moving object detected. When the moving object detection section detects the moving object in the detection area on a right side of the vehicle, the display control section controls a left display section provided in a left area relative to the driver's seat to display information regarding the moving object.

8 Claims, 9 Drawing Sheets

(51) Int. Cl.
  *B60R 1/00* (2006.01)
  *G09G 3/20* (2006.01)
(52) U.S. Cl.
  CPC ... *B60K 2350/352* (2013.01); *B60R 2300/301* (2013.01); *B60R 2300/70* (2013.01); *B60R 2300/8026* (2013.01); *B60R 2300/8093* (2013.01); *G02B 2027/014* (2013.01); *G02B 2027/0138* (2013.01)

(56) References Cited

U.S. PATENT DOCUMENTS

| | | | | |
|---|---|---|---|---|
| 7,859,565 | B2* | 12/2010 | Schofield | B60N 2/002 348/148 |
| 8,390,440 | B2* | 3/2013 | Krautter | B60K 35/00 340/435 |
| 2002/0084894 | A1* | 7/2002 | Horng | B60R 1/00 340/435 |
| 2003/0227424 | A1* | 12/2003 | Lynch | B60R 1/00 345/7 |
| 2004/0178894 | A1* | 9/2004 | Janssen | B60K 35/00 340/435 |
| 2007/0219709 | A1 | 9/2007 | Ikeda | |
| 2009/0058678 | A1* | 3/2009 | Matsuoka | B60Q 9/008 340/904 |
| 2009/0140845 | A1* | 6/2009 | Hioki | B60K 35/00 340/425.5 |
| 2013/0044218 | A1* | 2/2013 | Matsuda | B60R 1/00 348/148 |
| 2014/0268353 | A1* | 9/2014 | Fujimura | G02B 27/0101 359/630 |

FOREIGN PATENT DOCUMENTS

| | | |
|---|---|---|
| JP | H11-048828 A | 2/1999 |
| JP | 2002019491 A * | 1/2002 |
| JP | 2003291688 A * | 10/2003 |
| JP | 2005-134971 A | 5/2005 |
| JP | 2006-088758 A | 4/2006 |
| JP | 2006224700 A * | 8/2006 |
| JP | 2010018201 A * | 1/2010 |
| JP | 2012-113605 A | 6/2012 |
| JP | 2013-164688 A | 8/2013 |
| WO | WO 2014/076841 A1 * | 5/2014 |

* cited by examiner

SAFETY CONFIRMATION SUPPORT SYSTEM FOR VEHICLE DRIVER AND METHOD FOR SUPPORTING SAFETY CONFIRMATION OF VEHICLE DRIVER

CROSS REFERENCE TO RELATED APPLICATION

This application is based on Japanese Patent Application No. 2014-120101 filed on Jun. 11, 2014, the disclosure of which is incorporated herein by reference.

TECHNICAL FIELD

The present disclosure relates to a safety confirmation support system for a vehicle driver and a method for supporting safety confirmation of a vehicle driver.

BACKGROUND

Some of traffic accidents are likely to occur due to driver's safety confirmation being insufficient. Various techniques for supporting a safety confirmation performed by a driver have been developed. For example, JP 2013-164688 A proposes a technique of detecting a moving object, such as a pedestrian and a bicycle, approaching to a vehicle, and displaying information regarding the moving object detected on a display screen of a car navigation system to notify the presence of the moving object of a driver.

In the technique of JP 2013-164688 A, if the driver who is gazing on an object in a direction, such as another vehicle, confirms the information regarding the moving object displayed on the display screen by changing his eye direction from the object to the display screen, it is difficult to pay careful attention to the object.

SUMMARY

It is an object of the present disclosure to provide a safety confirmation support system for a vehicle driver and a method for supporting a safety confirmation of a vehicle driver, which are capable of arousing a driver to perform a safety confirmation for a moving object without requiring the driver to change a direction to gaze.

According to a first aspect of the present disclosure, a safety confirmation support system is for supporting a safety confirmation performed by a driver of a vehicle. The safety confirmation support system includes a moving object detection section, a plurality of display sections, and a display control section. The moving object detection section detects a moving object approaching to the vehicle in any of a plurality of detection areas around the vehicle. The display sections are disposed in different directions relative to a driver's seat of the vehicle. Each of the plurality of display sections being related to any of the plurality of detection areas in a predetermined relationship. The display control section controls at least one of the display sections related to the detection area in which the moving object has been detected to display information regarding the moving object detected. The plurality of display sections include a right display section provided in a right area relative to the driver's seat and a left display section provided in a left area relative to the driver's seat. When the moving object detection section detects the moving object in a detection area that is one of the detection areas and is on a left side of the vehicle, the display control section controls the right display section to display information regarding the moving object detected. When the moving object detection section detects the moving object in a detection area that is one of the detection areas and is on a right side of the vehicle, the display control section controls the left display section to display information regarding the moving object detected.

The display sections and the detection areas are related to each other in a predetermined relationship. Therefore, the presence of the moving object in a detection area that is away from the driver's view can be notified to the driver who is gazing in a direction in which any one of the display sections is in his view without requiring the driver to change the direction to gaze. As such, it is possible to arouse the driver to perform a safety confirmation for the moving object.

The direction that the drive gazes changes according to a situation. If the information regarding the moving objects detected in the plural detection areas are all displayed in a common display device, such as a display of a car navigation system, the driver may overlook the information. On the other hand, the display sections are arranged in different directions from the driver's seat and are related to the plural detection areas in the predetermined relationship. When the information regarding the moving object is displayed by the display section that is in the driver's view, the driver can easily recognize the moving object and can pay attention to the moving object. Further, the information regarding the moving object that has been detected in the detection area in the driver's view is not displayed in the display section that is in the driver's view. Since the information regarding the moving object that has been recognized by the driver is not displayed in the display section in an overlapped manner, it is less likely that the driver will feel annoying.

According to a second aspect of the present disclosure, a method for supporting a safety confirmation of a driver of a vehicle includes: detecting a moving object approaching to the vehicle in any of a plurality of detection areas around the vehicle; and controlling at least one of a plurality of display sections that is related to the detection area in which the moving object has been detected to display information regarding the moving object detected. The plurality of display sections includes a right display section that is provided in a right area relative to a driver's seat and a left display section that is provided in a left area relative to the driver's seat. The controlling the at least one of the plurality of display sections includes controlling the right display section, when the moving object is detected in a detection area that is one of the plurality of the detection areas and is on a left side of the vehicle, to display information regarding the moving object detected. The controlling the at least one of the plurality of display sections includes controlling the left display section, when the moving object is detected in a detection area that is one of the plurality of the detection areas and is on a right side of the vehicle, to display information regarding the moving object detected.

BRIEF DESCRIPTION OF THE DRAWINGS

The above and other objects, features and advantages of the present disclosure will become more apparent from the following detailed description made with reference to the accompanying drawings, in which like parts are designated by like reference numbers and in which.

DETAILED DESCRIPTION

Hereinafter, embodiments of the present disclosure will be described with reference to the drawings.

Figure 1:
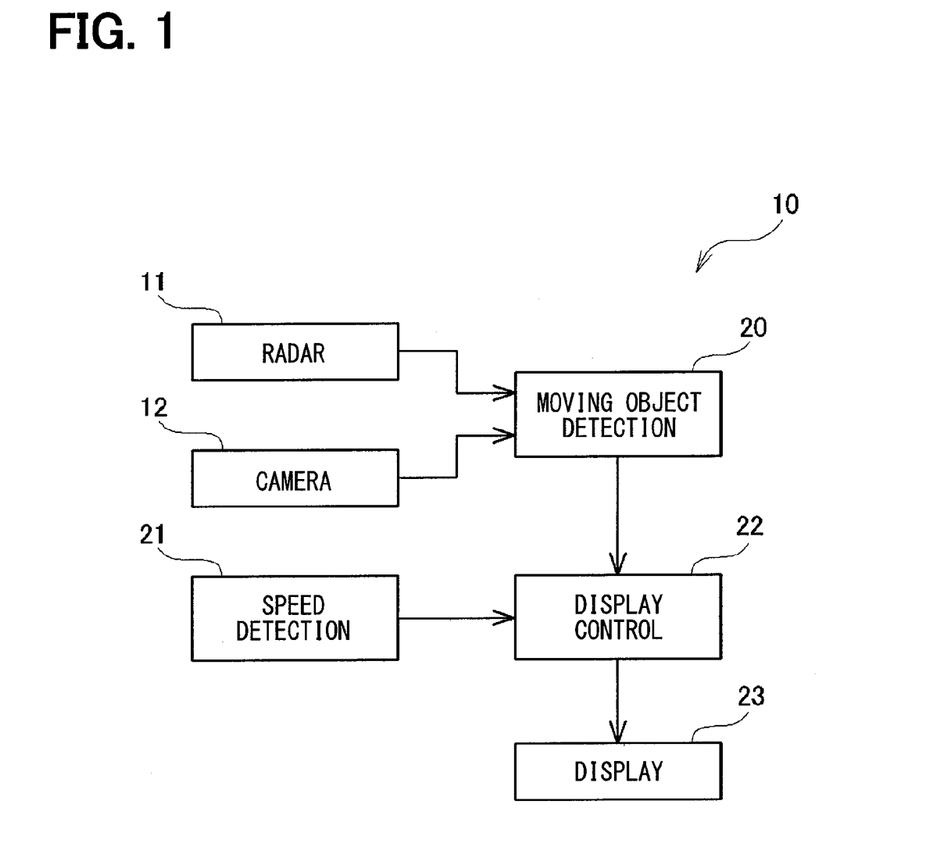
FIG. 1 is a schematic block diagram illustrating a structure of a safety confirmation support system according to an embodiment of the present disclosure.

A. Structure:

Referring to FIG. 1, a safety confirmation support system 10 according to an embodiment includes a moving object detection portion 20, a vehicle speed detection portion 21, a display control portion 22 and a display portion 23.

The moving object detection portion 20, the vehicle speed detection portion 21, the display control portion 22 and the display portion 23 are provided by conceptually dividing the safety confirmation support system 10 in a standpoint of functions. It is not always necessary that the moving object detection portion 20, the vehicle speed detection portion 21, the display control portion 22 and the display portion 23 exist physically independent from each other. Each of or any combination of the moving object detection portion 20, the vehicle speed detection portion 21, the display control portion 22 and the display portion 23 may be configured or implemented by each of or any combination of various devices, electronic components, integrated circuits, computer including a CPU, a memory such as a ROM and a RAM, or computer program stored in the memory.

The moving object detection portion 20 is connected with a radar 11 and a camera 12. The radar 11 emits a radio wave toward a predetermined detection area around a vehicle 1 and receives a reflection wave to acquire information regarding a target. The camera 12 captures an image of the detection area.

The moving object detection portion 20 detects a moving object approaching to the vehicle 1 in the detection area based on the target information acquired by the radar 11 or the image captured by the camera 12. In the present embodiment, the moving object detection portion 20 corresponds to a moving object detection section, and the camera 12 corresponds to a photographing section.

The vehicle speed detection portion 21 detects a speed (traveling speed) of the vehicle 1. In the present disclosure, the vehicle 1 to which the safety confirmation support system 10 is equipped will also be referred to as an own vehicle.

When the vehicle speed detected by the vehicle speed detection portion 21 is equal to or lower than a predetermined speed and the moving object detection portion 20 detects a moving object, the display control portion 22 controls the display portion 23 to display information regarding the moving object as an image. The display portion 23 includes plural display portions, such as display portions 23R, 23C, 23L. The display control portion 22 controls the plural display portions. The control of the display control portion 22 will be described later in detail.

In the present embodiment, the display control portion 22 corresponds to a display control section, and the display portion 23 corresponds to an example of a display section.

Figure 2:
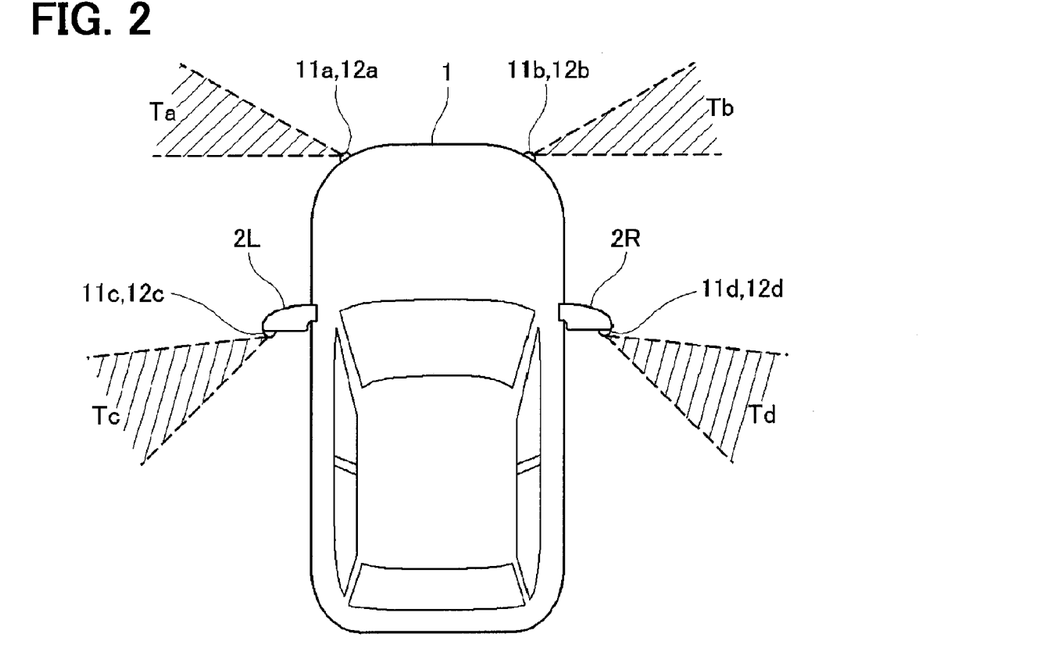
FIG. 2 is a diagram illustrating detection areas around a vehicle according to the embodiment.

As shown in FIG. 2, plural detection areas are provided around the vehicle 1. For example, there are four detection areas, such as a first detection area Ta, a second detection area Tb, a third detection area Tc, and a fourth detection area Td, around the vehicle 1. The first detection area Ta is provided at a front left area of the vehicle 1. The second detection area Tb is provided at a front right area of the vehicle 1. The third detection area Tc is provided at a left side area of the vehicle 1. The fourth detection area Td is provided at a right side area of the vehicle 1.

The radar 11 includes plural radars, such as a first radar 11a, a second radar 11b, a third radar 11c, and a fourth radar 11d. Similarly, the camera 12 includes plural cameras, such as a first camera 12a, a second camera 12b, a third camera 12c, and a fourth camera 12d. The first to fourth radars 11a, 11b, 11c and 11d and the first to fourth cameras 12a, 12b, 12c and 12d, as the radar 11 and the camera 12, are arranged correspondingly to the first to fourth detection areas Ta, Tb, Tc and Td.

Specifically, the first radar 11a and the first camera 12a are provided at a left area of the front part of the vehicle 1 toward the first detection area Ta. The second radar 11b and the second camera 12b are provided at a right area of the front part of the vehicle 1 toward the second detection area Tb. The third radar 11c and the third camera 12c are provided at a left sideview mirror 2L of the vehicle 1 toward the third detection area Tc. The fourth radar 11d and the fourth camera 12d are provided at a right sideview mirror 2R of the vehicle 1 toward the fourth detection area Td.

Figure 3:
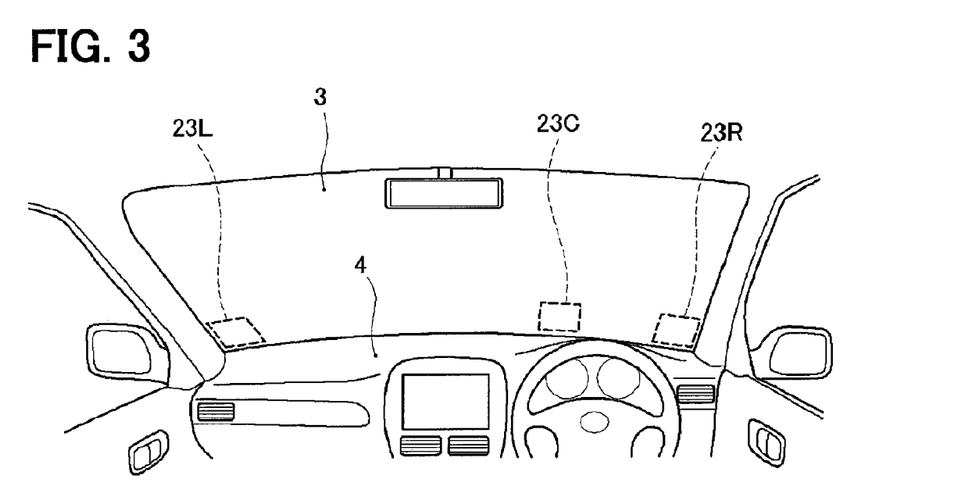
FIG. 3 is a diagram illustrating display portions of the safety confirmation support system mounted in the vehicle according to the embodiment.

As shown in FIG. 3, the display portion 23 is, for example, provided by or implemented by a head-up display (HUD) apparatus. The display portion 23 displays a virtual image overlapping with a front view (scene) of the vehicle 1 by projecting an image onto a display area of a windshield 3 from a body device of the HUP apparatus installed in a dashboard 4.

FIG. 3 indicates a position of the display area of the windshield 3 onto which the image is projected, as the display portion 23. For example, the display portion 23 includes the left display portion 23L, the right display portion 23R and the frontal display portion 23C, as the display areas. The left display portion 23L is provided at a left lower portion of the windshield 3. The right display portion 23R is provided at a right lower portion of the windshield 3. The frontal display portion 23C is provided at a lower portion of the windshield 3 in front of a driver's seat.

B. Safety Confirmation Support Processing

Figure 4:
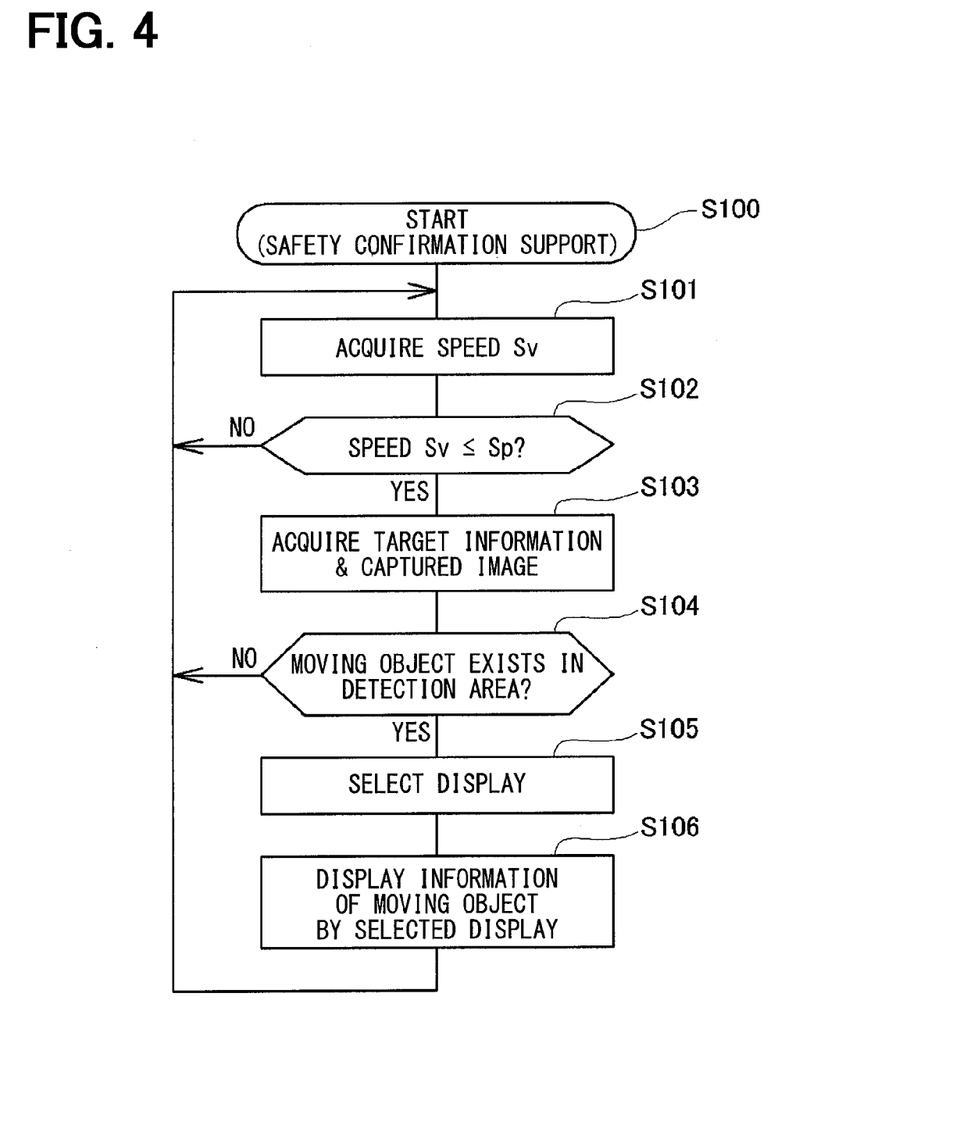
FIG. 4 is a flowchart of a safety confirmation support processing performed by the safety confirmation support system according to the embodiment.

The safety confirmation support system 10 performs a safety confirmation support processing according to a flowchart of FIG. 4.

When the safety confirmation support processing is started at S100, the vehicle speed (travelling speed) Sv of the vehicle 1 is acquired first at S101. It is determined at S102 whether the vehicle speed Sv is equal to or lower than a predetermined speed Sp (e.g., 5 km/h). In the present embodiment, the safety confirmation support system 10 is for supporting the safety confirmation performed by the driver at the time of temporary halt of the vehicle 1 or when the vehicle 1 travels at a low speed. When the vehicle speed Sv is higher than the predetermined speed Sp (S102: NO), the processing returns to the beginning and waits while checking the vehicle speed.

Note that a position information or a map information may be additionally acquired from a car navigation system. It may be determined whether the driver is in a situation requiring support for the safety confirmation (e.g., at an intersection) based on the position information or the map information, in addition to the vehicle speed Sv.

When the vehicle speed Sv is equal to or less than the predetermined speed Sp (S102: YES), the information regarding a target (hereinafter, referred to as the target information) captured by the radar 11 and an image captured by the camera 12 are acquired at S103. It is determined at S104 whether a moving object approaching to the vehicle 1 is present in any detection area based on the target information and the captured image acquired.

As described above, there are the four detection areas Ta, Tb, Tc and Td around the vehicle 1. It is determined whether a moving object is present in any of the detection areas Ta, Tb, Tc and Td by analyzing the target information captured by the radars 11a, 11b, 11c and 11d. Further, a type of the moving object, such as a pedestrian or a person riding on a bicycle (hereinafter, simply referred to as the bicycle), is determined by analyzing the images captured by the cameras 12a, 12b, 12c and 12d. Plural templates of pedestrians and bicycles have been prepared beforehand. The type of the moving object is determined based on which template the moving object coincides with.

In the present embodiment, the radar 11 is used for detecting the moving object. However, the moving object may be detected by any other devices. For example, the moving object may be detected using a sonar that acquires a target information by emitting a sound wave to a detection area and receiving the reflection. As another example, an object approaching to the vehicle 1 may be detected as the moving object by storing the image captured by the camera 12 and comparing the image with the image captured immediately before.

When there is no moving object in the detection areas (S104: NO), the processing returns to the beginning and checks the vehicle speed Sv at S101.

When there is the moving object in any of the detection areas (S104: YES), any of the display portions 23L, 23C, 23R is selected according to the detection area Ta to Td in which the moving object has been detected, at S105. The display portion 23 (23L, 23C, 23R) selected is controlled to display the information regarding the moving object (e.g., the captured image of the moving object) at S106. Thereafter, the safety confirmation support processing returns to the beginning and repeats the process described above.

In the present embodiment, each of the display portions 23L, 23C and 23R is associated to any of the detection areas Ta, Tb, Tc and Td. The display portion to display the moving object detected is different depending on the detection area where the moving object has been detected.

Figure 5:
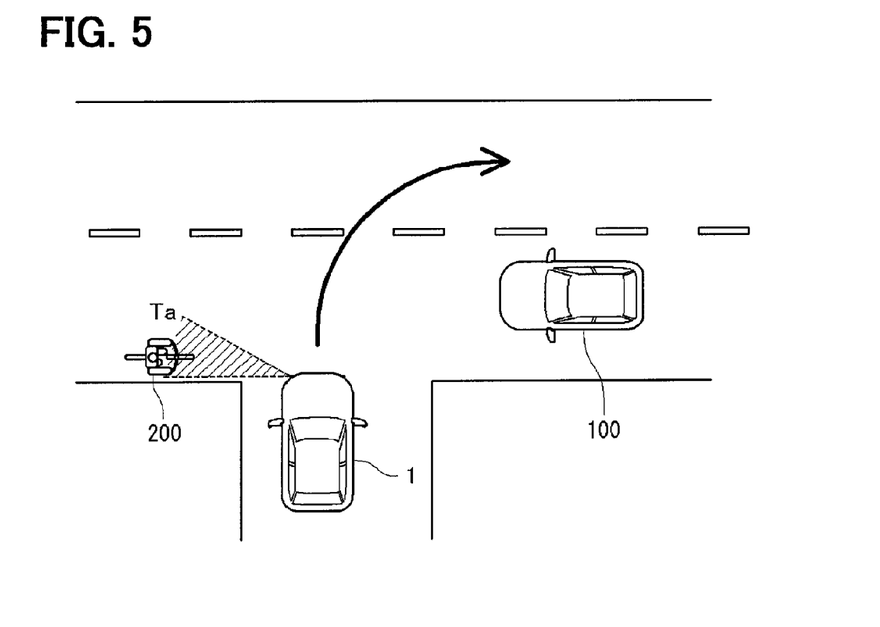
FIG. 5 is a diagram for explaining a first situation where a moving object is detected around the vehicle.

C. First Situation:

FIG. 5 illustrates a first situation as an example where a moving object is detected around the own vehicle 1. In the first situation, the own vehicle 1 is temporarily stopped at an end of a narrow road (e.g., non-priority road) of a T-shaped crossroad in order to turn right to enter a wide road (priority road having a priority higher than that of the narrow road). In the priority road, there is another vehicle (different vehicle) 100 approaching to the own vehicle 1 on the right side and a bicycle 200 approaching to the own vehicle 1 on the left side.

In the first situation, the bicycle 200 is detected as a moving object in the first detection area Ta set at the left front area of the own vehicle 1.

Figure 6:
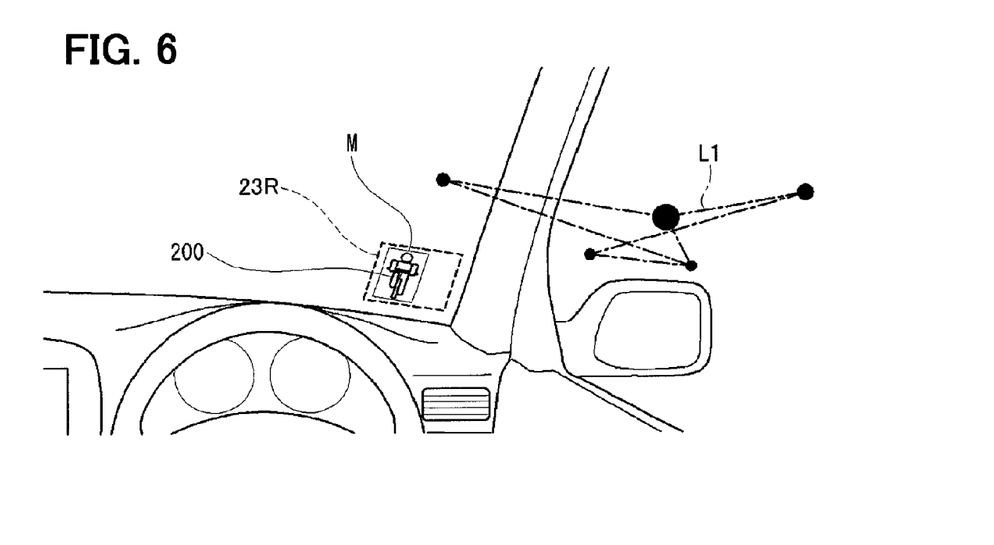
FIG. 6 is a diagram for illustrating a display mode of the moving object displayed by a display portion in the first situation.

FIG. 6 illustrates a state where the information regarding the moving object is displayed by the display portion 23 in the first situation. In FIG. 6, a chain dashed line L1 connecting solid circles indicates a track of the driver's eyes in the first situation. The size of solid circles is proportional to the length of time the driver's eyes stayed. That is, the size of the solid circles is increased with the length of time the driver's eyes stayed.

The driver's gaze is more concentrated on the right side than the left side with respect to the driver's seat for confirming the safety of the different vehicle 100 approaching to the own vehicle 1 on the right side. In this case, the driver's attention to the moving object (bicycle) 200 approaching to the own vehicle 1 on the left side is less than that to the different vehicle 100.

In the present embodiment, the right display portion 23R is associated with the first detection area Ta. When the moving object 200 is detected in the first detection area Ta, the image of the moving object 200 captured by the first camera 12a is displayed in the right display portion 23R.

In this case, it is possible to notify the driver who is gazing in a rightward direction in which the right display portion 23R is in the driver's view of the presence of the moving object 200 detected in the first detection area Ta, which is on the opposite side to the driver's gazing direction. As such, it is possible to arouse the driver to perform the safety confirmation for the moving object 200.

When the driver is gazing in a leftward direction in which the left display portion 23L is in the driver's view, a possibility that the moving object 200 detected in the first detection area Ta is in the driver's view is high. For this reason, the left display portion 23L is not associated with the first detection area Ta, and the information regarding the moving object 200 detected in the first detection area Ta is no displayed by the left display portion 23L.

On the contrary to the example of FIG. 5, it is assumed that there are another vehicle (different vehicle) approaching to the own vehicle 1 on the left side and a bicycle approaching to the own vehicle 1 on the right side, in the priority road. In this case, the driver tends to more concentrate on the left side than on the right side for the safety confirmation of the different vehicle approaching to the own vehicle 1 on the left side, and thus to pay less attention to the moving object (bicycle) approaching to the own vehicle on the right side than to the different vehicle.

For this reason, the left display portion 23L is associated with the second detection area Tb (see FIG. 2) set to the right front area of the own vehicle 1. When the moving object is detected in the second detection area Tb, the image of the moving object captured by the second camera 12b is displayed by the left display portion 23L.

Therefore, the driver can recognize the presence of the moving object detected in the second detection area Tb while gazing in the leftward direction in which the left display portion 23L is in the driver's view.

In the present embodiment, the vehicle 1 is, for example, a right-hand drive vehicle in which the driver's seat is on the right side. Therefore, in a state where the driver is viewing in the frontward direction, the driver less perceives a moving object approaching to the own vehicle 1 on the left side than a moving object approaching to the own vehicle 1 on the right side.

For this reason, the frontal display portion 23C (see FIG. 3) is associated with the first detection area Ta. When a moving object is detected in the first detection area Ta, an image of the moving object detected in the first detection area Ta is displayed by the frontal display portion 23C.

Therefore, even when the driver is gazing in the frontward direction of the vehicle in which the frontal display portion 23C is in the driver's view, the driver can easily recognize the presence of the moving object approaching to the own vehicle 1 on the left side.

The display portion 23 is included in a region (induced visual field) defined in approximately 50 degrees in the right and left direction, approximately 35 degrees in the upward direction and approximately 50 degrees in the downward direction relative to the driver's eyes. In this case, the driver can recognize the change in the induced visual field. The display portion 23 displays no image until a moving object is detected. That is, the display portion 23 displays an image of a moving object only after the moving object is detected. As such, the display portion 23 can notify the driver of the presence of the moving object to arouse the driver to perform the safety confirmation for the moving object.

The display portion 23 displays the captured image of the moving object, as the information regarding the moving object. In this case, since an area that is not viewed by the driver is compensated by the image displayed by the display portion 23. Therefore, the driver can confirm the moving object without facing in the direction where the moving object is detected, that is, without changing his eyes in the direction where the moving object is detected.

In the display portion 23, in addition to the display of the captured image including the moving object, the moving object may be marked in the image to be highlighted, as shown in FIG. 6. For example, the moving object may be surrounded with a closing line M as the marking. In such a case, the driver can easily recognize the moving object. For example, in the image of the detection area captured by the camera 12 and displayed by the display portion 23, a portion including the moving object may be enlarged. In such a case, reliability of the information of the moving object improves.

Figure 7:
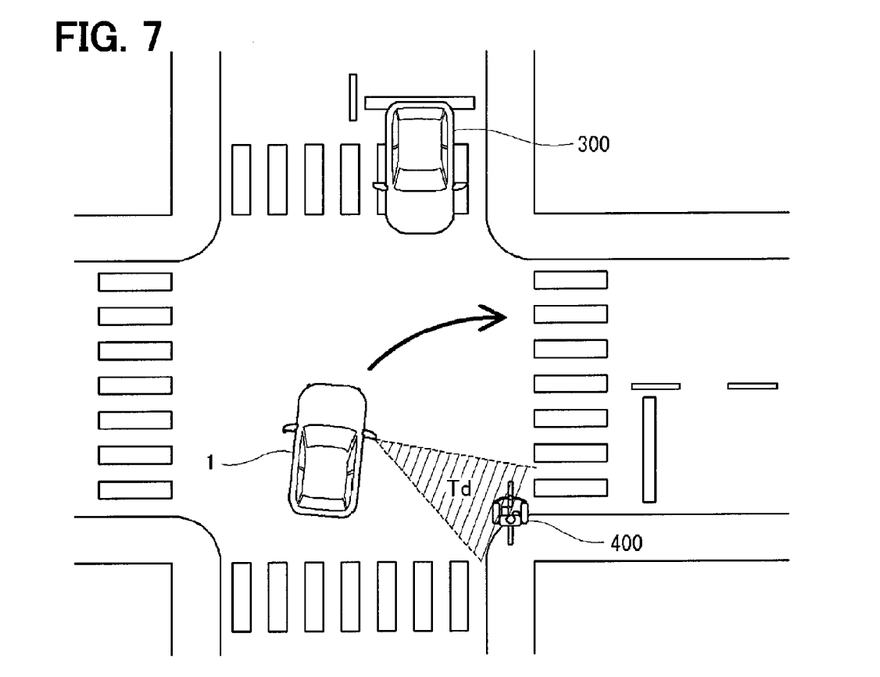
FIG. 7 is a diagram for explaining a second situation where a moving object is detected around the vehicle.

D. Second Situation:

FIG. 7 illustrates a second situation as an example where a moving object is detected around the own vehicle 1. In the second situation, the own vehicle 1 is temporarily stopped before turning right in an intersection because there is another vehicle (different vehicle) 300 travelling straight on an opposite lane. Further, there is a bicycle 400 coming from the back of the own vehicle 1 on the right side and going to across a crosswalk on a right ahead of the own vehicle 1.

In such a second situation, the bicycle 400 is detected as a moving object in the fourth detection area Td set at the right side area of the own vehicle 1. In the present embodiment, the fourth detection area Td is set in an area that is not reflected in the right sideview mirror 2R, but can be viewed when the driver faces rightward.

Figure 8:
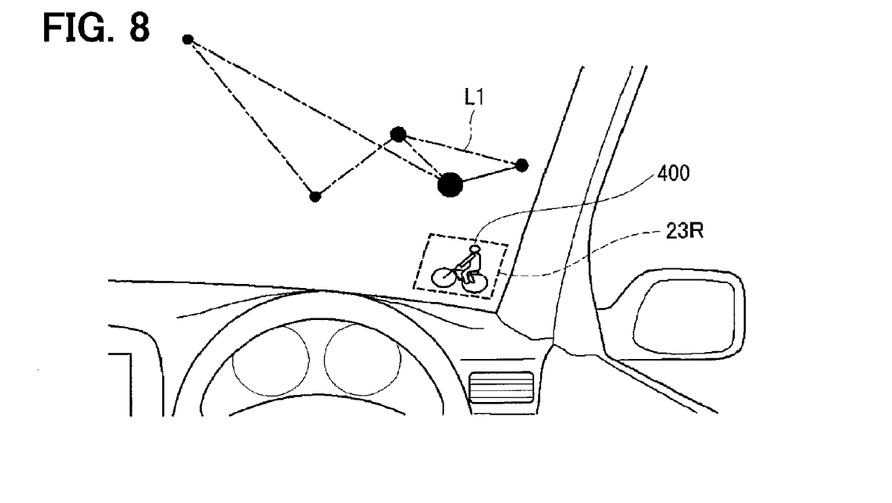
FIG. 8 is a diagram for illustrating a display mode of the moving object displayed by the display portion in the second situation.

FIG. 8 illustrates a state where the information regarding the moving object 400 is displayed by the display portion 23 in the second situation. In FIG. 8, a chain dashed line L1 connecting solid circles indicates a track of the driver's eyes in the second situation. The size of solid circles is proportional to the length of time the driver's eyes stayed. That is, the size of the solid circles is increased with the length of time the driver's eyes stayed.

The driver's eye direction is concentrated on the front right area of the driver's seat for the safety confirmation to the oncoming different vehicle 300 travelling straight on the opposite lane while checking the change of a traffic signal. In this case, the driver pays less attention to the moving object (bicycle) 400 crossing the crosswalk on the right ahead of the own vehicle 1, than to the oncoming different vehicle 300.

For this reason, the fourth detection area Td is associated with the right display portion 23R. When a moving object is detected in the fourth detection area Td, an image of the moving object (image captured by the fourth camera 12d oriented toward the fourth detection area Td) is displayed by the right display portion 23R.

In this case, the display portion 23R is in the view of the driver who is gazing on the front right area from the driver's seat. The display portion 23R can notify the driver who is gazing on the front right area of the presence of the moving object detected in the fourth detection area Td that is in a direction orthogonal to the driver's gazing direction. As such, it is possible to arouse the driver to perform the safety confirmation for the moving object.

As described above, in the safety confirmation support system 10 of the present embodiment, the plural display portions 23 (e.g., the right display portion 23R, the frontal display portion 23C and the left display portion 23L) are disposed in different directions from the driver to be viewed in different directions from the driver's seat, and associated with any of the plural detection areas Ta, Tb, Tc and Td set around the vehicle 1. The information regarding a moving object is displayed by controlling the display portion that is associated with the detection area in which the moving object is detected. As the information regarding the moving object, for example, the captured image (photographed image) of the moving object is displayed. The display portions are suitably associated with the detection areas in a predetermined relationship. For the driver who is gazing in a direction in which any of the display portions is in the driver's view, the presence of the moving object detected in the detection area that is in a direction different from the gazing direction of the driver can be notified by displaying the image of the moving object by the display portion that is in the driver's view. Therefore, it is possible to arouse the driver to perform the safety confirmation for the moving object. As a result, an occurrence of a minor collision with the moving object can be reduced.

The driver's gazing direction changes according to a situation. If the information regarding the moving object detected in any of the detection areas is displayed in one display portion common in the detection areas, such as on a display screen of a car navigation system, the driver may overlook the information regarding the moving object. In the present embodiment, on the other hand, the plural display portions each of which is associated with any of the plural detection areas are arranged in different directions from the driver, and the information regarding the moving object is displayed in the display portion that is in the driver's view. In this case, the driver can easily recognize the information, and is aware of performing the safety confirmation for the moving object.

Since the display portions and the detection areas are suitably associated to each other in a predetermined relationship, information regarding a moving object detected in the detection area that is in the driver's view is not displayed in the display portion that is in the driver's view. In this case, the information regarding the moving object that has been already recognized by the driver is not displayed by the display portion in an overlapping manner. Therefore, it is less likely that the driver will feel annoying.

E. Modifications:

The embodiment described above can be modified in various ways. Modifications of the embodiment will be described hereinafter.

E-1. First Modification:

In the embodiment described above, the image of the moving object captured by the camera 12 (12a, 12b, 12c, 12d) oriented toward the detection area (Ta, Tb, Tc, Td), as the information regarding the moving object detected in the detection area (Ta, Tb, Tc, Td). However, the information regarding the moving object displayed by the display portion 23 is not limited to the captured image of the moving object. The information may be displayed in any manner as long as the information can bring the driver's attention to the moving object.

Figure 9:
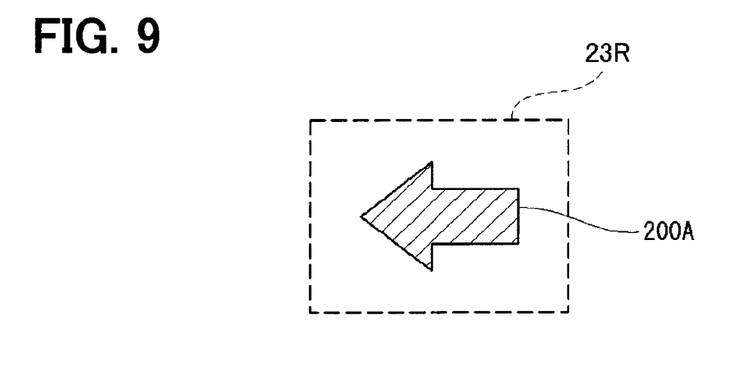
FIG. 9 is a diagram for illustrating a display mode of information regarding a moving object displayed by a display portion according to a first modification.

FIG. 9 illustrates an example of the information regarding the moving object displayed by the display portion 23 of the first modification. The example shown in FIG. 9 is displayed by the right display portion 23R (see FIG. 6) in the first situation of FIG. 5.

In the first modification, an arrow 200A indicating a direction in which the moving object 200 has been detected is displayed as the information regarding the moving object 200.

Also in this case, the presence of the moving object 200 and the direction in which the moving object 200 is detected can be notified to the driver, and the driver can be aware of the moving object 200. Therefore, it is possible to arouse the driver to perform the safety confirmation for the moving object 200.

In this case, the camera 12 for capturing the image of the moving object is not necessary. Therefore, the notification of the moving object can be implemented in a simple manner.

Figure 10:
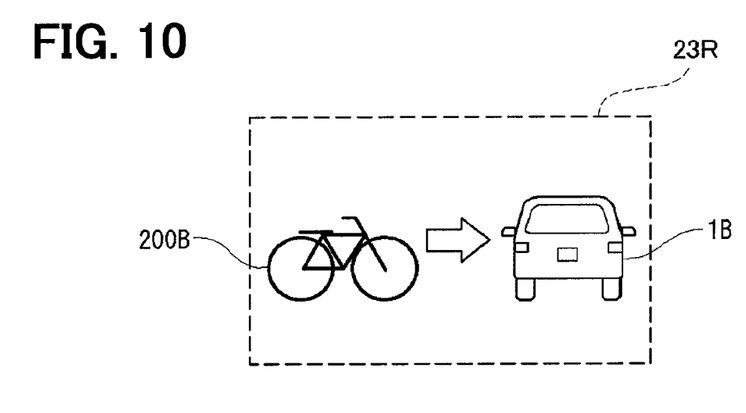
FIG. 10 is a diagram for illustrating a display mode of information regarding a moving object displayed by a display portion according to a second modification.

E-2. Second Modification:

FIG. 10 illustrates an example of the information regarding the moving object displayed by the display portion 23 of the second modification. The example shown in FIG. 10 is displayed by the right display portion 23R (see FIG. 6) in the first situation of FIG. 5. In the second modification, an image 1B representing the own vehicle 1 and an image 200B representing the moving object 200 are displayed, and an approaching direction of the moving object 200 toward the own vehicle 1 is indicated by an arrow.

In this case, the approaching direction of the moving object 200 to the own vehicle 1 can be notified to the driver. That is, the driver can recognize from which direction the moving object 200 is coming. Therefore, it is possible to cause the driver to be aware of the moving object 200 and to arouse the driver to perform the safety confirmation for the moving object 200.

Figure 11:
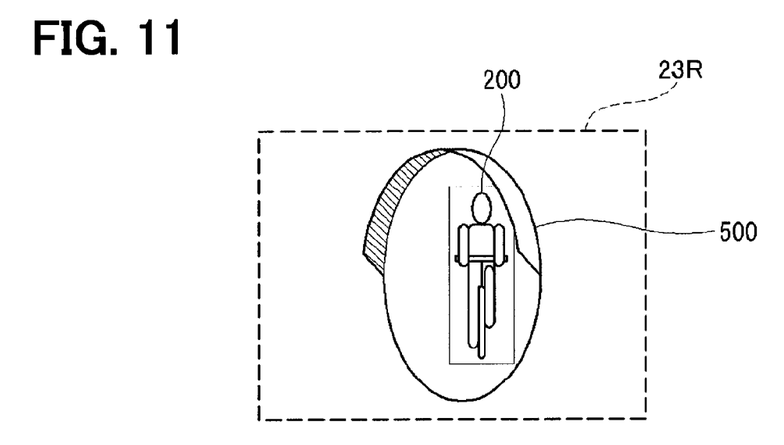
FIG. 11 is a diagram for illustrating a display mode of information regarding a moving object displayed by a display portion according to a third modification.

E-3. Third Modification:

FIG. 11 illustrates an example of the information regarding the moving object displayed by the display portion 23 of the third modification. The example shown in FIG. 11 is displayed by the right display portion 23R (see FIG. 6) in the first situation of FIG. 5.

In the third modification, a display frame 500 representing a convex traffic mirror, which is generally used at a road curve, is displayed, and the captured image of the moving object (bicycle) 200 of the detection area is displayed in the display frame 500. The display frame 500 is oriented toward a direction in which the moving object 200 has been detected, and the captured image of the moving object 200 is displayed as a mirror image which is reversed in a horizontal direction.

In this case, the driver can recognize the direction of the moving object 200 based on the direction of the display frame 500, and can confirm the moving object 200 by the mirror image reflected (displayed) in the display frame 500.

The convex traffic mirror is generally used at the curve of a road for the safety confirmation. Since the information of the moving object 200 is displayed in a manner imitating such a convex traffic mirror used for the safety confirmation, the driver can easily recognize the moving object 200.

E-4. Fourth Modification:

In the embodiment described above, the information regarding the moving object is displayed by controlling the display portion 23 (23L, 23C, 23R) associated with the detection area (Ta, Tb, Tc, Td) in which the moving object has been detected, irrespective of the direction that the driver is gazing (i.e., the driver's eye direction). Alternatively, the driver's eye direction may be detected, and the display portion 23 may be controlled according to the driver's eye direction detected.

Figure 12:
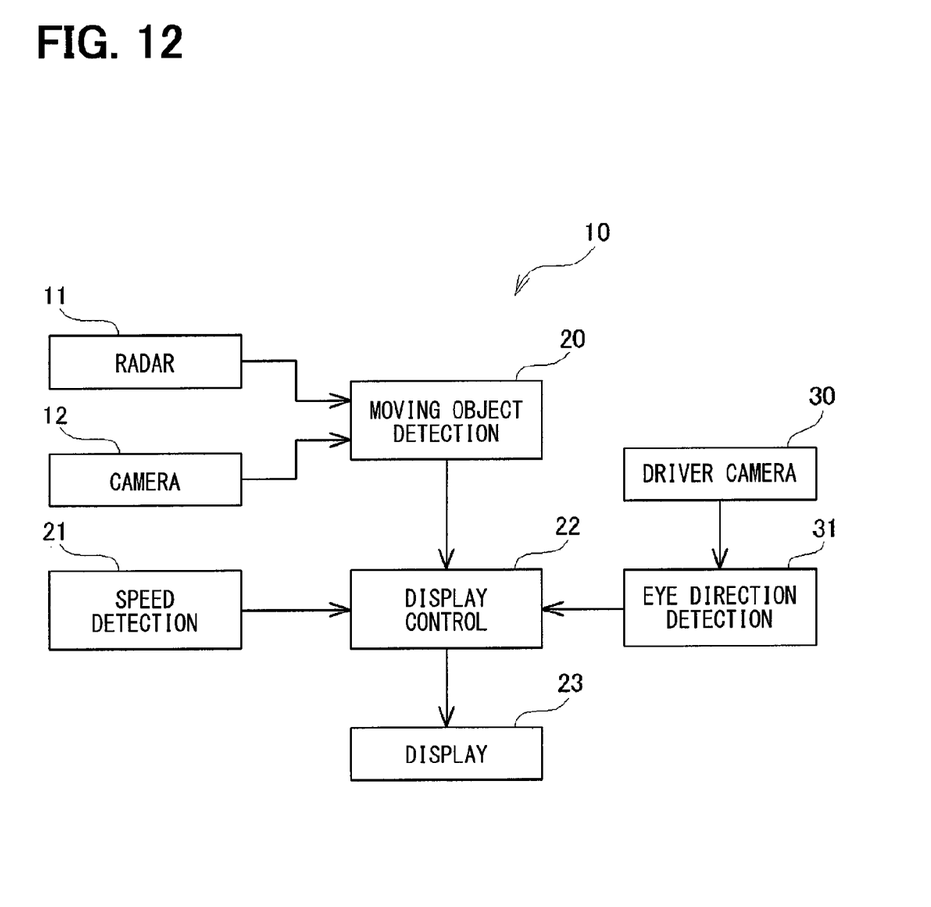
FIG. 12 is a schematic block diagram illustrating a structure of a safety confirmation support system according to a fourth modification.

FIG. 12 illustrates a structure of the safety confirmation support system 10 of a fourth modification. The safety confirmation support system 10 of the fourth modification includes an eye direction detection portion 31, in addition to the moving object detection portion 20, the vehicle speed detection portion 21, the display control portion 22, and the display portion 23. The eye direction detection portion 31 is connected with a driver camera 30 that is installed in a passenger compartment for capturing a face image of a driver.

The eye direction detection portion 31 analyzes the driver's face image captured by the driver camera 30 to detect the driver's eye direction. The eye direction detection portion 31 corresponds to an eye direction detection section. The display control portion 22 controls the display portion 23 based on the driver's eye direction detected by the eye direction detection portion 31.

Figure 13:
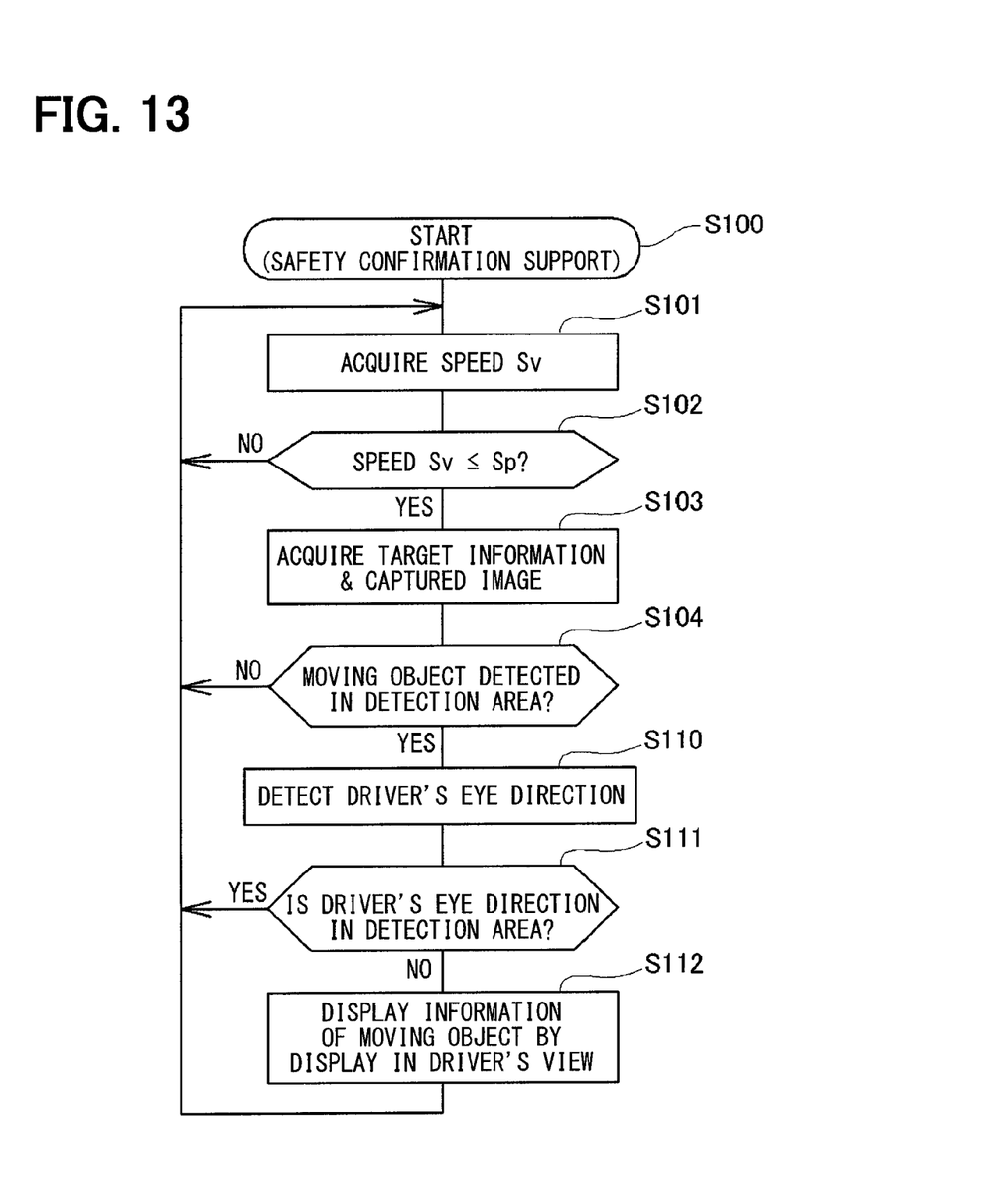
FIG. 13 is a flowchart of a safety confirmation support processing performed by a safety confirmation support system according to the fourth modification.

The safety confirmation support system 10 of the fourth modification performs a safety confirmation support processing according to a flowchart of FIG. 13.

When the safety confirmation support processing is started at S100, the vehicle speed (travelling speed) Sv of the vehicle 1 is acquired at S101, and it is determined at S102 whether the vehicle speed Sv is equal to or lower than a predetermined speed Sp (e.g., 5 km/h). When the vehicle speed Sv is higher than the predetermined speed Sp (S102: NO), the processing returns to the beginning and waits while checking the vehicle speed.

When the vehicle speed Sv is equal to or less than the predetermined speed Sp (S102: YES), the target information regarding a target captured by the radar 11 and an image captured by the camera 12 are acquired at S103. It is determined at S104 whether there is a moving object approaching to the vehicle 1 in the detection areas based on the target information and the captured image acquired. When there is no moving object in the detection area (S104: NO), the processing returns to the beginning and checks the vehicle speed Sv at S101.

When there is the moving object in any of the detection areas (S104: YES), the driver's eye direction is detected at S110. The driver's eye direction can be detected based on the position of an iris part (iris of the eye) specified in the driver's face image captured by the driver camera 30, for example.

Next, it is determined at S111 whether the eye direction of the driver is toward the detection area (Ta, Tb, Tc, Td) in which the moving object has been detected. For example, when the driver's eye direction is in the first detection area Ta (the left front area of the own vehicle 1) in which the moving object 200 has been detected in the first situation in FIG. 5 (S111: YES), a possibility that the driver has already recognized the moving object 200 is high, the processing returns to the beginning of the safety confirmation support processing without displaying the information regarding the moving object 200.

On the contrary, when the driver's eye direction is not in the detection area in which the moving object has been detected (S111: NO), a possibility that the driver has not recognized the moving object is high, the information regarding the moving object is displayed in the display portion 23 that is in the driver's view, at S112. For example, when the moving object is detected in the first detection area Ta and the driver's eye direction is toward the different vehicle 100 approaching to the own vehicle 1 on the right side in the first situation of FIG. 5, the information regarding the moving object 200 is displayed by the right display portion 23R. Thereafter, the processing returns to the beginning and repeats the process described above.

As described above, in the safety confirmation support system 10 of the fourth modification, the driver's eye direction is detected and the display portion 23 is controlled according to the driver's eye direction detected. Therefore, the information regarding the moving object, which is in the detection area that is not viewed by the driver, can be displayed by the display portion 23 that is in the driver's view. As such, the presence of the moving object that is hardly recognized by the driver can be notified to the driver, and it is possible to arouse the driver to perform the safety confirmation.

If the information regarding the moving object is displayed in the display portion 23 that is outside of the driver's view, such the information is not viewed by the driver. Since the information regarding the moving object is not displayed in the display portion 23 that is outside of the driver's view, power consumption in the display portion 23 can be reduced.

Further, the information regarding the moving object detected in the detection area corresponding to the driver's eye direction is not displayed by the display portion that is in the driver's view. Therefore, the driver does not feel annoying due to the information of the moving object that has been already recognized being displayed by the display portion in an overlapped manner with a front view.

The embodiment and the modifications thereof described above are further modified as follows.

For example, in the embodiment described above, the display portion 23 is provided by or implemented by the head-up display device. In the case where the information regarding the moving object is provided by the head-up display device, the display portion 23 (display portions 23R, 23C, 23L) may be recognized as the display area in the windshield 3 or in any other element, such as a combiner or a film disposed adjacent to the windshield 3. Alternatively, the display portion 23 may intend to include a display area and a display element that causes the display area to display the information regarding the moving object. However, the structure to provide or implement the display portion 23 is not limited to the head-up display device as long as the information regarding the moving object can be displayed.

Figure 14:
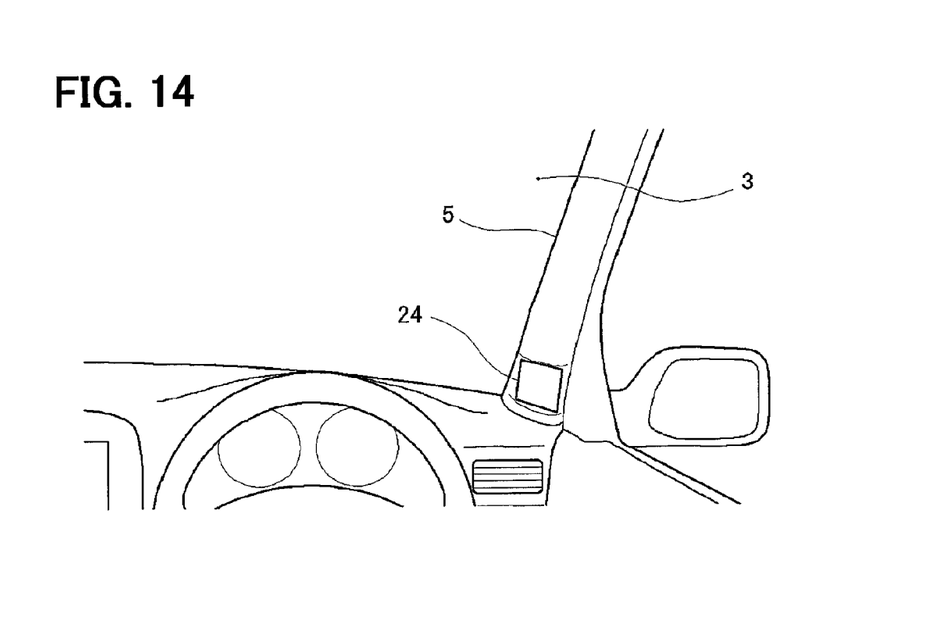
FIG. 14 is a diagram for illustrating a liquid crystal display arranged on an interior side of an A-pillar, as a modification of the display portion.

In place of the display portion 23, as shown in FIG. 14, a display portion 24 provided by a liquid crystal display may be installed in an interior side of a pillar on each of the right and left sides of the windshield 3, which is so-called A pillar, so that a display screen of the display portion 24 faces the driver.

Figure 15:
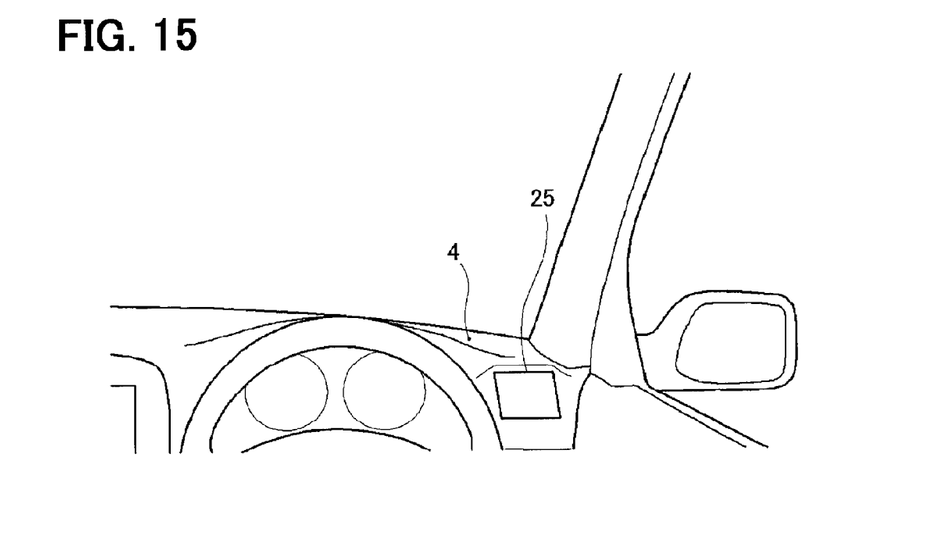
FIG. 15 is a diagram for illustrating a liquid crystal display installed in a right end of a dashboard, as another modification of the display portion.

In place of the display portion 23, as shown in FIG. 15, a display portion 25 provided by a liquid crystal display may be installed in each of right and left ends of the dashboard 4 so that a display screen of the display portion 25 faces the driver.

In the embodiment described above, the information regarding the moving object can be displayed in any of the three display portions (23L, 23C, 23R). However, the position to display the information regarding the moving object may be modified.

For example, the display areas to display the information regarding the moving object may be set in any position of the windshield 3 so that the image can be projected to any position of the windshield 3 by the head up display device. When the driver's eye direction is detected as in the fourth modification, a virtual image of the information regarding the moving object may be displayed in a predetermined area around the driver's eye direction detected.

The relationship between the display portions (23L, 23C, 23R) and the detection areas (Ta, Tb, Tc, Td) may not be limited to the examples of the embodiment described above.

For example, when the driver is gazing in a direction in which the right display portion 23R is in his view, the driver cannot view the left side area of the own vehicle 1 (e.g., the third detection area Tc). Therefore, the third detection area Tc may be associated with the right display portion 23R, so that the information regarding a moving object detected in the third detection area Tc is displayed by the right display portion 23R.

When the driver is gazing in a direction in which the left display portion 23L is in his view, the driver cannot view the left side area of the own vehicle 1 (e.g., the third detection area Tc) and the right side area (e.g., the fourth detection area Td) of the own vehicle 1. Therefore, the third detection area Tc and the fourth detection area Td may be associated with the left display portion 23L so that the information regarding the moving object detected in the third detection area Tc or the fourth detection area Td is displayed in the left display portion 23L.

For example, when the moving object detection portion 20 detects a moving object in a detection area that is on a left side of the own vehicle 1, such as in the first detection area Ta or the third detection area Tc, the display control portion 22 controls the right display portion 23R to display information regarding the moving object detected. When the moving object detection portion 20 detects a moving object in a detection area that is on a right side of the own vehicle 1, such as in the second detection area Tb or the fourth detection area Td, the display control portion 22 controls the left display portion 23L to display information regarding the moving object detected.

While only the selected exemplary embodiment and examples have been chosen to illustrate the present disclosure, it will be apparent to those skilled in the art from this disclosure that various changes and modifications can be made therein without departing from the scope of the disclosure as defined in the appended claims. Furthermore, the foregoing description of the exemplary embodiment and examples according to the present disclosure is provided for illustration only, and not for the purpose of limiting the disclosure as defined by the appended claims and their equivalents.

What is claimed is:

1. A safety confirmation support system for supporting a safety confirmation performed by a driver of a vehicle, the safety confirmation support system comprising:
    a moving object detection section including a motion detector that detects a moving object approaching to the vehicle in a plurality of detection areas around the vehicle;
    a plurality of display sections that is provided in different directions from a driver's seat of the vehicle, each of the plurality of display sections being associated with any of the plurality of detection areas in a predetermined relationship;
    a display control section that controls the plurality of display sections to display information regarding the moving object detected by the moving object detection section; and
    an eye direction detection section including an image capturing device that detects an eye direction of the driver when the moving object detection section has detected the moving object in a detection area that is one of the plurality of detection areas, wherein
    the plurality of display sections includes a right display section provided in a right area relative to the driver's seat and a left display section provided in a left area relative to the driver's seat, and
    the moving object detection section and the display control section cooperating as follows:
        when the moving object detection section detects the moving object in a detection area that is one of the plurality of detection areas and is on a left side of the vehicle, the display control section controls the right display section to display information regarding the moving object,
    the display control section and the eye direction detection section cooperating as follows:
        when the moving object detection section detects the moving object in a detection area that is one of the plurality of detection areas and is on a right side of the vehicle, the display control section controls the left display section to display information regarding the moving object,
        when the eye direction detection section detects the eye direction of the driver is away from the detection area in which the moving object has been detected, the display control section controls the display section that is located in a driver's view to display the information regarding the moving object, and
        when the eye direction detection section detects the eye direction of the driver is in a direction corresponding to the detection area in which the moving object has been detected, the display control section prohibits the display section that is located in the driver's view from displaying the information regarding the moving object.

2. The safety confirmation support system according to claim 1, wherein
    the driver's seat is disposed adjacent to one of the right side and the left side of the vehicle,
    the plurality of display sections includes a frontal display section provided in front of the driver's seat,
    when the moving object detection section detects the moving object in a detection area that is one of the detection areas and is on a side opposite to the one of the right side and the left side on which the driver's seat is disposed, the display control section controls the frontal display section to display information regarding the moving object.

3. The safety confirmation support system according to claim 1, wherein
    the information regarding the moving object includes a direction in which the moving object is detected.

4. The safety confirmation support system according to claim 1, further comprising:
    a photographing section including a camera that captures an image of each of the detection areas, wherein
    the information regarding the moving object includes an image of the detection area in which the moving object is detected and that is captured by the photographing section.

5. The safety confirmation support system according to claim 4, wherein
    in the image of the detection area displayed as the information regarding the moving object, the moving object is displayed in at least one of a marked manner or an enlarged manner.

6. The safety confirmation support system according to claim 1, wherein
    when the eye direction detection section detects the eye direction of the driver is in the direction corresponding to the detection area in which the moving object has been detected, the display control section prohibits the display sections that are not in the driver's view from displaying the information regarding the moving object.

7. A method for supporting a safety confirmation of a driver of a vehicle, the method comprising:
    detecting a moving object approaching to the vehicle in any of a plurality of detection areas around the vehicle;
    detecting a driver's eye direction when the moving object has been detected in any of the plurality of detection areas; and
    controlling at least one of a plurality of display sections to display information regarding the moving object detected, each of the plurality of display sections being associated with any of the plurality of detection areas in a predetermined relationship, wherein
    the plurality of display sections includes a right display section that is provided in a right area relative to a driver's seat and a left display section that is provided in a left area relative to the driver's seat,
    the controlling the at least one of the plurality of display sections includes:
        controlling the right display section, when the moving object has been detected in a detection area that is one of the plurality of detection areas and is on a left side of the vehicle, to display information regarding the moving object, controlling the left display section, when the moving object is detected in a right detection area that is one of the plurality of detection areas and is on a right side of the vehicle, to display information regarding the moving object, and prohibiting the display section that is in a driver's view from displaying the information regarding the moving object when the driver's eye direction is in a direction corresponding to the detection area in which the moving object has been detected.

8. A safety confirmation support system for supporting a safety confirmation performed by a driver of a vehicle, the safety confirmation support system comprising:

a moving object detection section including a motion detector that detects a moving object approaching to the vehicle in a plurality of detection areas around the vehicle;

a plurality of display sections that is provided in different directions from a driver's seat of the vehicle, each of the plurality of display sections being associated with any of the plurality of detection areas in a predetermined relationship;

a display control section that controls the plurality of display sections to display information regarding the moving object detected by the moving object detection section; and an eye direction detection section including an image capturing device that detects an eye direction of the driver, when the moving object detection section has detected the moving object in a detection area that is one of the plurality of detection areas, wherein the plurality of display sections includes a right display section provided in a right area relative to the driver's seat and a left display section provided in a left area relative to the driver's seat, and the moving object detection section, the display control section and the eye direction detection section cooperating as follows:

when the moving object detection section detects the moving object in a detection area that is one of the plurality of detection areas and is on a left side of the vehicle, the display control section controls the right display section to display information regarding the moving object, when the moving object detection section detects the moving object in a detection area that is one of the plurality of detection areas and is on a right side of the vehicle, the display control section controls the left display section to display information regarding the moving object, when the eye direction detection section detects the eye direction of the driver in a direction corresponding to the detection area in which the moving object has been detected, the display control section prohibits the plurality of display sections from displaying the information regarding the moving object.

* * * * *